(12) United States Patent
Yamada (10) Patent No.: US 8,336,669 B2
(45) Date of Patent: Dec. 25, 2012

(54) STEERING APPARATUS (75) Inventor: Yasuhisa Yamada, Gunma (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 13/058,890

(22) PCT Filed: Sep. 10, 2010

(86) PCT No.: PCT/JP2010/065584
§ 371 (c)(1),
(2), (4) Date: Feb. 13, 2012

(87) PCT Pub. No.: WO2011/048883
PCT Pub. Date: Apr. 28, 2011

(65) Prior Publication Data
US 2012/0125708 A1    May 24, 2012

(30) Foreign Application Priority Data
Oct. 23, 2009  (JP) .................. 2009-244115

(51) Int. Cl.
B62D 5/04    (2006.01)

(52) U.S. Cl. ....................... 180/443; 280/752

(58) Field of Classification Search .............. 180/443; 280/752, 748, 753, 751; 74/493
See application file for complete search history.

(56) References Cited

U.S. PATENT DOCUMENTS

| 3,621,732 | A  | * | 11/1971 | Kaniut ............................ 74/492 |
| 3,964,578 | A  | * | 6/1976  | Campbell et al. ............ 188/377 |
| 4,834,422 | A  | * | 5/1989  | Oikawa et al. ............... 280/751 |
| 4,978,138 | A  | * | 12/1990 | Hikone et al. ................ 280/777 |
| 6,345,842 | B1 | * | 2/2002  | Igarashi et al. .............. 280/775 |
| 6,702,324 | B2 | * | 3/2004  | Shimoyamada et al. ..... 280/752 |
| 7,134,692 | B2 | * | 11/2006 | Yamamura .................... 280/777 |
| 7,364,189 | B2 | * | 4/2008  | Morris et al. ................. 280/732 |
| 7,384,070 | B2 | * | 6/2008  | Sato et al. ..................... 280/777 |
| 8,056,925 | B2 | * | 11/2011 | Fukawatase et al. ......... 280/731 |
| 2001/0015551 | A1 | * | 8/2001  | Muramatsu et al. .......... 280/750 |
| 2005/0285383 | A1 | * | 12/2005 | Yae et al. ...................... 280/777 |

FOREIGN PATENT DOCUMENTS

| JP | H0221155   | 2/1990 |
| JP | 2004046958 | 2/1992 |
| JP | 2000177602 | 6/2000 |
| JP | 2008013148 | 1/2008 |
| JP | 2008056222 | 3/2008 |

* cited by examiner

Primary Examiner — Tashiana Adams
(74) Attorney, Agent, or Firm — Hartman Global IP Law; Gary M. Hartman; Domenica N. S. Hartman (57) ABSTRACT Low cost construction of a steering apparatus is provided that is capable of protecting an operator's knees 28 during an automobile collision. A tilted plate 30 is arranged below and behind a bottom end section of a housing 21 which is a component of an electric power assist mechanism 20 connected to a front end section of a steering column 9. In case that the automobile is in a collision, automobile equipment 29 that moves forward under pressure from the driver's knees hits against a bottom surface of the tilted plate. This allows the impact energy to be absorbed by the elasticity or deformation of the tilted plate 30 during impact, and after impact as well, the automobile equipment 29 to move in a direction along the bottom surface of the tilted plate.

9 Claims, 13 Drawing Sheets

STEERING APPARATUS

CROSS REFERENCE TO RELATED APPLICATIONS

This application claims the benefit of International Application No. PCT/JP2010/065584 filed Sep. 10, 2010, having a claim of priority to JP patent application number 2009-244115, filed Oct. 23, 2009.

TECHNICAL FIELD

The present invention is a steering apparatus used for applying a steering angle to wheels of a vehicle, and more particularly to a steering apparatus comprising construction capable of protecting the knees of the operator during a collision of the vehicle.

RELATED ART

Figure 9:
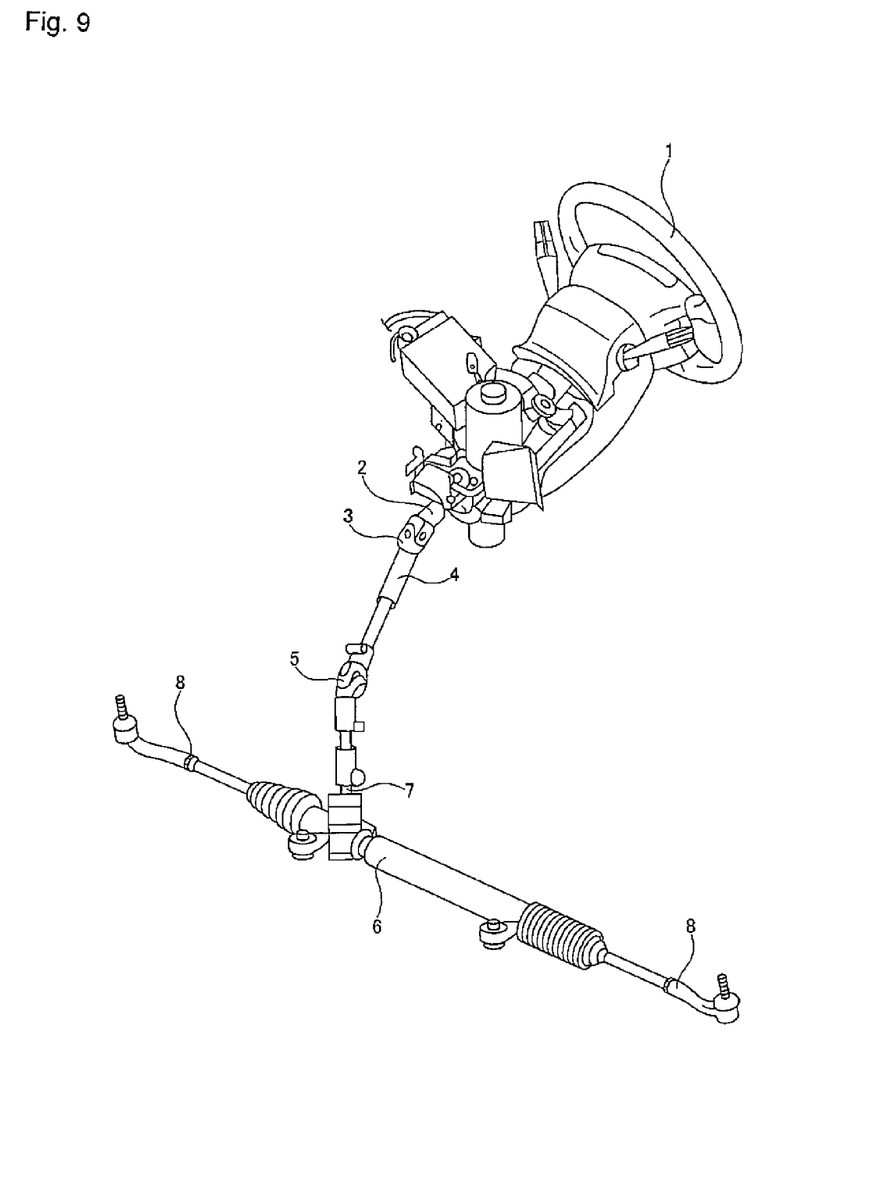
FIG. 9 is a perspective diagram illustrating the basic construction of a steering apparatus.

As illustrated in FIG. 9, a steering apparatus for an automobile basically comprises: a steering wheel 1; a steering shaft 2 that rotates based on operation of the steering wheel 1; a first universal joint 3, an intermediate shaft 4 and second universal joint 5 for transmitting this rotation; and a steering gear unit 6 to which the rotation is transmitted via these members. The steering gear unit 6 comprises: an input shaft 7 to which the rotation above is transmitted, and a pair of tie rods 8 that are pushed or pulled by the rotation of the input shaft 7 and apply a steering angle to the vehicle wheels.

FIGS. 10 to 13 illustrate an example of conventional construction of a column type electric power steering apparatus of this kind of automobile steering apparatus. A steering shaft 2, with a steering wheel 1 mounted to the rear-end section thereof, is supported in the inside of a steering column 9 such that it rotates freely. The front-end section of the steering column 9 is supported by a horizontal shaft 10 such that it freely pivots with respect to the automobile body 11. On the other hand, the middle section of the steering column 9 is supported by the automobile body 11 by way of a clamp mechanism 12. In the present invention, the front-rear relationship is defined by the front and rear in the direction of travel of the automobile. In other words, in FIGS. 1, 2, 4, 7, 8, 10 and 11, the left side is the "front side" and the right side is the "rear side".

The clamp mechanism 12 comprises: a pair of left and right clamp plates 14 which are components of a support bracket 13 that is supported by the automobile body; a lifting and lowering bracket 15 that is fastened to the portion held between both clamp plates 14 on the upper surface of the middle section of the steering column 9; a tilt bolt 18 that is inserted into a pair of long holes 16 that are long in the vertical direction and that are formed in both clamp plates 14 and a pair of through holes 17 that are formed in the lifting and lowering bracket 15; and a tilt lever 19 whose base end section is linked to the portion near the tip end of the tilt bolt 19. By operating the tilt lever 19, the height position of the steering wheel 1 can be freely adjusted.

In other words, by rotating the tilt lever 19 in a specified direction when adjusting the height position of the steering wheel 1, the clamping force of both clamp plates 14 that clamps this lifting and lowering bracket 15 is released. Then, in this state, by moving the tilt bolt 18 along both long holes 16, and pivoting the steering column 9, the steering wheel is moved to the desired height position. At this height position, by turning the tilt lever 19 in the opposite direction of the specified direction above, the clamping force is increased. Doing so makes it impossible for the steering column 9 to pivot, and the steering wheel 1 is secured at the adjusted height position.

In addition, a column type electric power assist mechanism 20 is assembled in the front-end section of the steering column 9. The electric-powered power assist mechanism 20 comprises a housing 21 which is a member connected to the front end section of the steering column 9, hereinafter referred to as a connected member. Moreover, an electric motor is supported on the side surface of the top section of a large-diameter main section 22 of the front section of the housing 21. A worm reduction gear (not illustrated in the figure) is housed inside the main section 22 of the housing 21, and functions to reduce the speed of rotation of the output shaft of the electric motor 23 and transmit that rotation to the steering shaft 2. A torque sensor (no illustrated in the figures) is housed inside the small-diameter sub section 24 of the rear section of the housing 21, and functions to detect the direction and size of the torque applied to the steering shaft 2 from the steering wheel 1. There is also a circuit board (not illustrated in the figures) for the torque sensor housed inside a large rectangular enclosed section 25 that is integrally formed at the bottom section of the sub section 24 of the housing 21. An opening section (not illustrated in the figures) for removing or inserting the circuit board is provided on the bottom surface of the enclosed section 25, however, in the figure, this opening section is covered by a rectangular flat plate shaped cover 26 that is fixed to the bottom surface of the enclosed section 25. The four corners of the cover 26 are fastened to the bottom surface of the enclosed section 25 by bolts 27. The electric-powered power assist mechanism 20 comprises a controller (not illustrated in the figure) that controls the electric power to the electric motor 23 based on a detection signal from the torque sensor and a signal that indicates the vehicle speed.

In order to apply a steering angle to the vehicle wheels, when the steering shaft 2 rotates based on operation of the steering wheel 1, the torque sensor detects the direction and size of the torque applied to the steering shaft 2 from the steering wheel 1 and sends that detection signal to the controller. Based on this detection signal, the controller supplies electric power to the electric motor 23, which rotates the steering shaft 2 via the worm reducer gear in the same direction as the direction of rotation of operation of the steering wheel 1. As a result, the steering shaft 2 rotates at a torque that is greater than the torque applied from the steering wheel.

Figure 10:
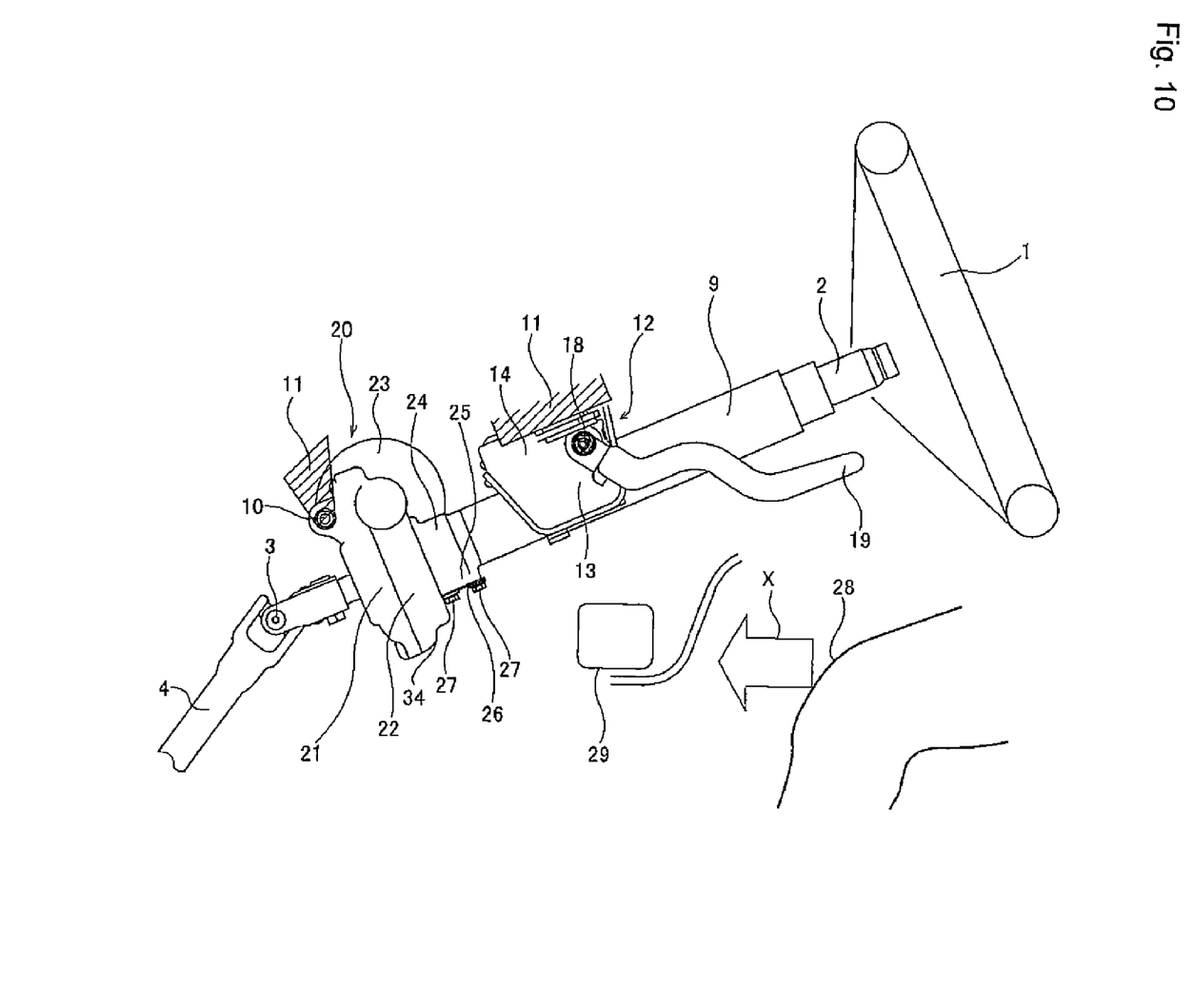
FIG. 10 is a side view illustrating an example of conventional construction of a steering apparatus that is the object of the present invention.
Figure 11:
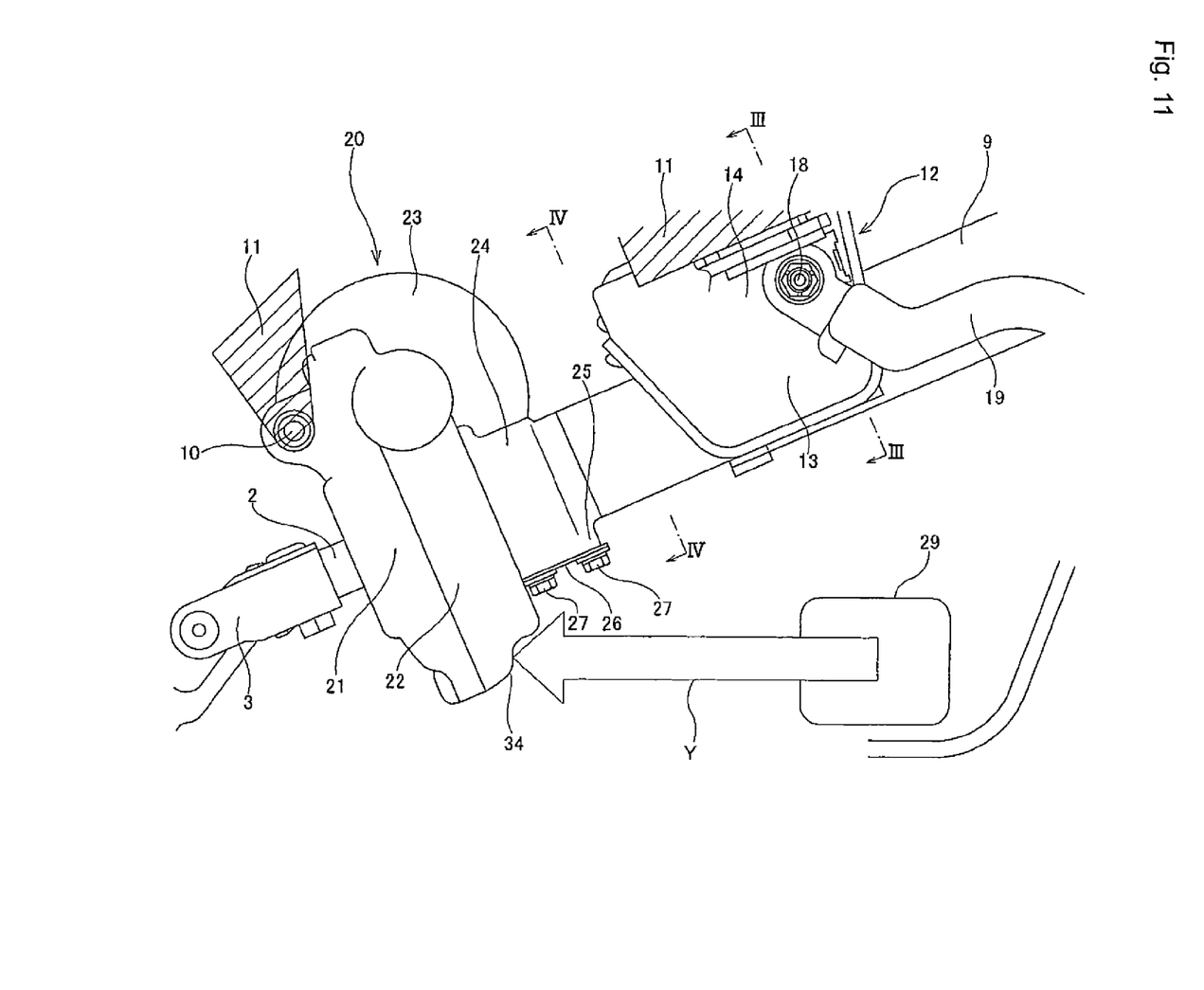
FIG. 11 is an enlarged diagram illustrating the main parts of FIG. 10.
Figure 12:
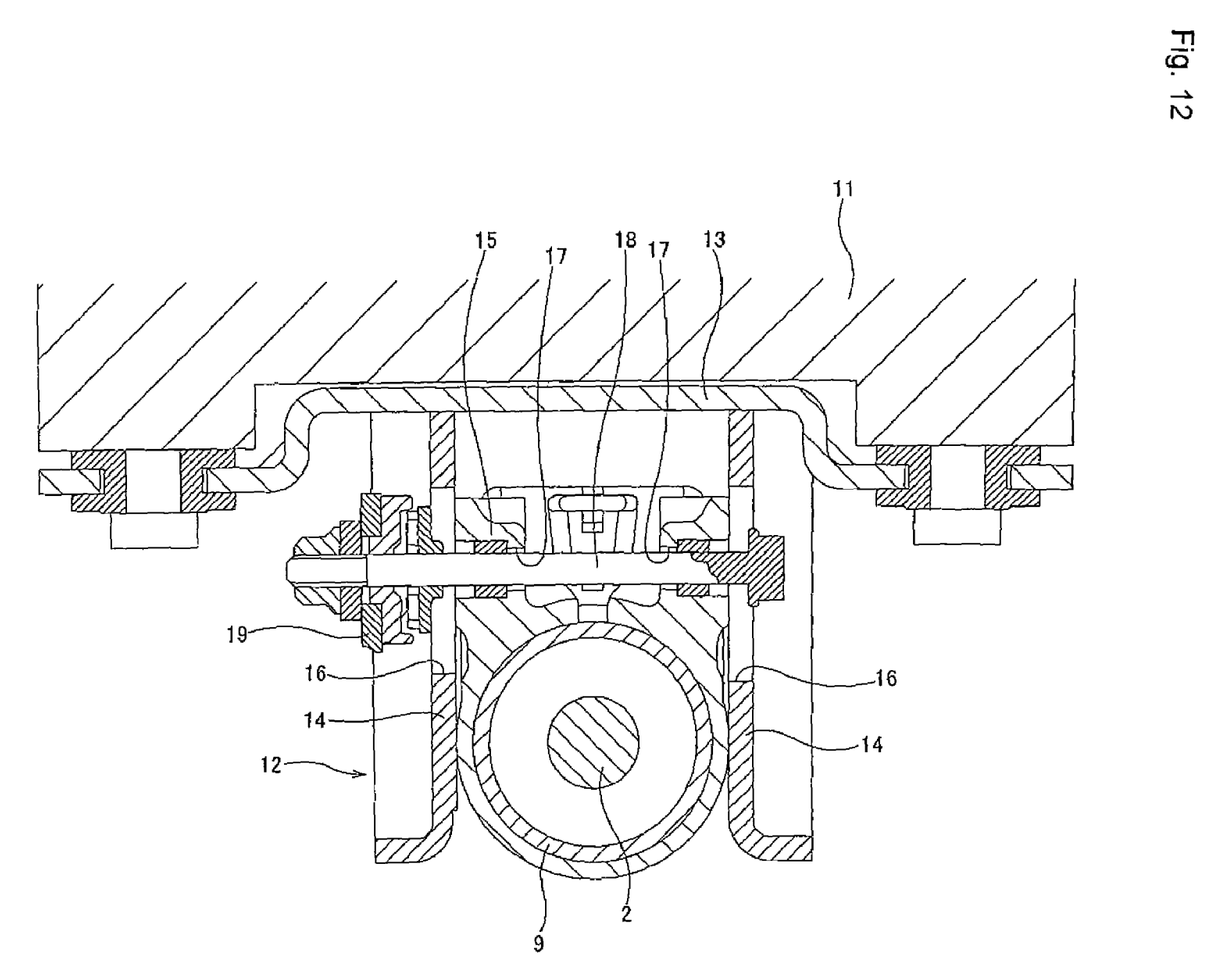
FIG. 12 is a cross-sectional diagram of section III-III in FIG. 11.
Figure 13:
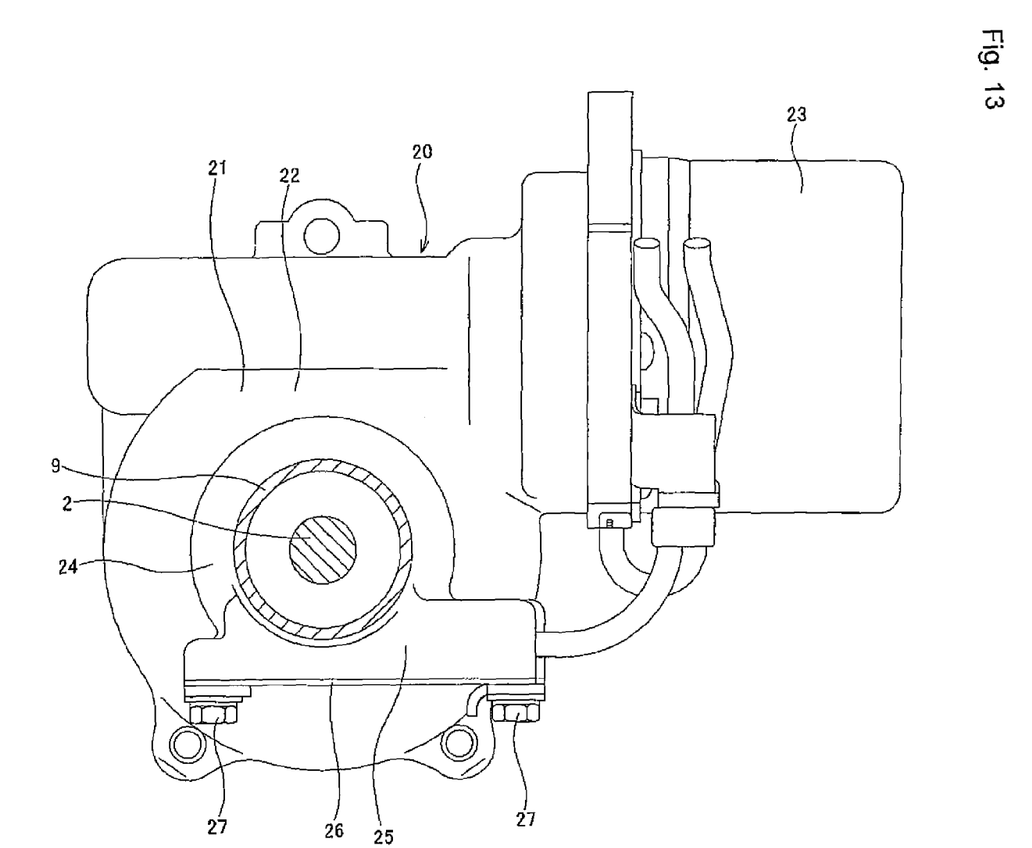
FIG. 13 is a cross-sectional diagram of section IV-IV in FIG. 11.

Incidentally, when an automobile is in a collision, the operator's body moves forward as illustrated by the "X" arrow in FIG. 10 due to inertia. When this happens, the operator's knees 28 hit against automobile equipment 29, such as a fuse box, that is located toward the front, and may push this automobile equipment 29 forward as illustrated by the "Y" arrow in FIG. 11. However, in the case of a column type power steering apparatus as illustrated in the figures, the bottom end section of the housing 21 of the electric-powered power-assist mechanism 20 is located at a small distance in front of the automobile equipment 29 in a state such that it protrudes downward more than the bottom surface of the front end section of the steering column 9. Therefore, there is a possibility that the automobile equipment 29 will move forward only a small distance and hit against the bottom end section of the housing 21. As a result, the movement of the automobile equipment will suddenly stop, possibly causing an undesirable situation such as applying a large impact to the operator's knees 28.

Therefore, a method of protecting the operator's knees during an automobile collision by providing an airbag apparatus at the front of the operator's knees has been considered as disclosed in patent literature 1. However, in the case of that invention, the airbag apparatus is expensive, so a large increase in cost is unavoidable.

RELATED ART LITERATURE

Patent Literature

[Patent Literature 1] JP 2008-013148 (A)

SUMMARY OF THE INVENTION

Problem to be Solved by the Invention

Taking the situation described above into consideration, the object of the present invention is to provide at low cost a steering apparatus having construction capable of protecting the operator's knees during an automobile collision.

Means for Solving the Problem

The steering apparatus of the present invention comprises: a steering column that is supported by a vehicle body, and a connected member that, when the steering column is supported by the vehicle body, is connected and fastened to a front end section of the steering column, with a bottom end section thereof protruding further downward than a bottom surface of the front end section of the steering column.

Particularly, in the steering apparatus of the present invention, a tilted plate that tilts downward in the forward direction is arranged below and behind a portion of the bottom end section of the connected member that protrudes further downward than the bottom surface of the front end section of the steering column, such that the tilted plate covers at least a central section in the width direction of the protruding section. Here, the width direction is the width direction of the vehicle.

The tilted plate may be a component of an accessory part that is connected and fastened to the steering column or the connected member directly or by way of another member.

The accessory part may be made from a single plate having elasticity such as a steel plate, stainless steel plate, other steel alloy plate or spring steel plate, synthetic resin plate, rubber plate or the like.

Preferably, the accessory part is capable of decreasing the tilt angle of the tilted plate with respect to a horizontal plane a specified amount by applying a pressure force to the bottom surface of the tilted plate, and has a function of absorbing the energy of the applied pressure by the decrease of this tilt angle and deformation of the tilted plate itself.

More specifically, the accessory part comprises, for example, an attachment section that is fastened to the steering column or connected member, the tilted plate, and a curved bend section having an arc shaped cross section that connects the attachment section and tilted plate.

The attachment section of the accessory part may function as a cover that covers an opening section that is formed in the steering column or connected member.

Preferably, the accessory part is constructed such that of the spacing between a top surface of the tilted plate and a bottom surface of the portion of the bottom end section of the connected member that protrudes further downward than the bottom surface of the front end section of the steering column, which face each other, a clearance gap is formed in the portion where the spacing is a minimum.

Furthermore, it is further preferred that the space between the top surface of the tilted plate and the bottom surface of the portion of the bottom end section of the connected member that protrudes further downward than the bottom surface of the front end section of the steering column, which face each other, is a minimum in the middle portion of the tilted plate.

The present invention can be widely applied to electric power steering apparatuses, including pinion type and rack type thereof, as well as to other kinds of steering apparatuses, in the case where electronic control equipment, sensors and the like are provided in the center of the steering shaft around the steering column, however, preferably is applied in particular to a column type electric power steering apparatus in which the connected member functions as a housing for housing an electric power assist mechanism.

Effect of the Invention

In the case of the steering apparatus of the present invention, constructed as described above, automobile equipment, such as a fuse box that is pushed forward by the operator's knees during an automobile collision, collides against the bottom surface of a tilted plate that is located in front of this automobile equipment and is smoothly directed to move in the direction along the bottom surface of the tilted plate (in a forward and downward direction). When this happens, due to the change in direction of movement of the automobile equipment around a collision, the impact energy applied toward the knees, which is equal to the energy of the pressure applied to the bottom surface of the tilted plate from the automobile equipment, is absorbed. In the case of the present invention, as the automobile equipment collides against the bottom surface of the tilted plate, the impact energy toward the knees is absorbed, and because the movement of the automobile equipment is not suddenly stopped by this collision, there is not a large impact on the operator's knees do to the collision. Therefore, in this invention, it is possible to protect the operator's knees during an automobile collision.

Moreover, in the case of the present invention, the tilted plate that is used in order to obtain this kind of effect is inexpensive when compared with an airbag apparatus for knees. Therefore, in the case of the present invention, construction capable of protecting the knees as described above can be achieved at low cost.

Moreover, by constructing the accessory part that comprises the tilted plate from a single plate having elasticity, together with having the advantage of improving the effect of decreasing the impact energy applied to the operator's knees by elastic deformation of the tilted plate itself, the manufacturing cost can be kept low.

Furthermore, by making the accessory part of a material that is capable of absorbing the energy of pressure applied to the bottom surface of the tilted plate, it is possible to improve the effect of decreasing the impact energy that is applied to the operator's knees. Particularly, by the accessory part provided with the attachment section, tilted section and curved bend section, it is possible to effectively prevent the impact (pressure energy) that is applied to the tilted plate from being transmitted to the attachment section, and thus the effect on the member (steering column or connected member) to which the attachment section is fastened can be kept to a minimum.

By forming a clearance gap in the portion where the spacing between the top surface of the tilted plate and the bottom surface of the connected member is a minimum so that there is no contact, it is possible to change the tilt angle of the tilted plate using this clearance gap, and thus is advantageous in that it is possible to improve the effect of decreasing the impact energy toward the knees.

Furthermore, by making the spacing between the top surface of the tilted plate and the bottom surface of the connected member a minimum in the center portion of the tilted plate, the bottom end section of the connected member is more completely covered by the portion of the tilted plate that is further toward the front side than this center portion, so together with being able to effectively prevent the automobile equipment from directly hitting against the connected member, it is possible for the automobile equipment to move smoothly along the bottom surface of the tilted plate.

In the case of a column type electric power steering apparatus, for example, an opening section is formed in the housing for the electric power assist mechanism, which is part of the connected member, so that circuit boards such as for the torque sensor can be removed or installed in the enclosed section, and by having the attachment section of the accessory part function as the cover to that opening section, it is possible to reduce the number of parts, and thus lower the cost.

BEST MODES FOR CARRYING OUT THE INVENTION

Embodiment 1

Figure 1:
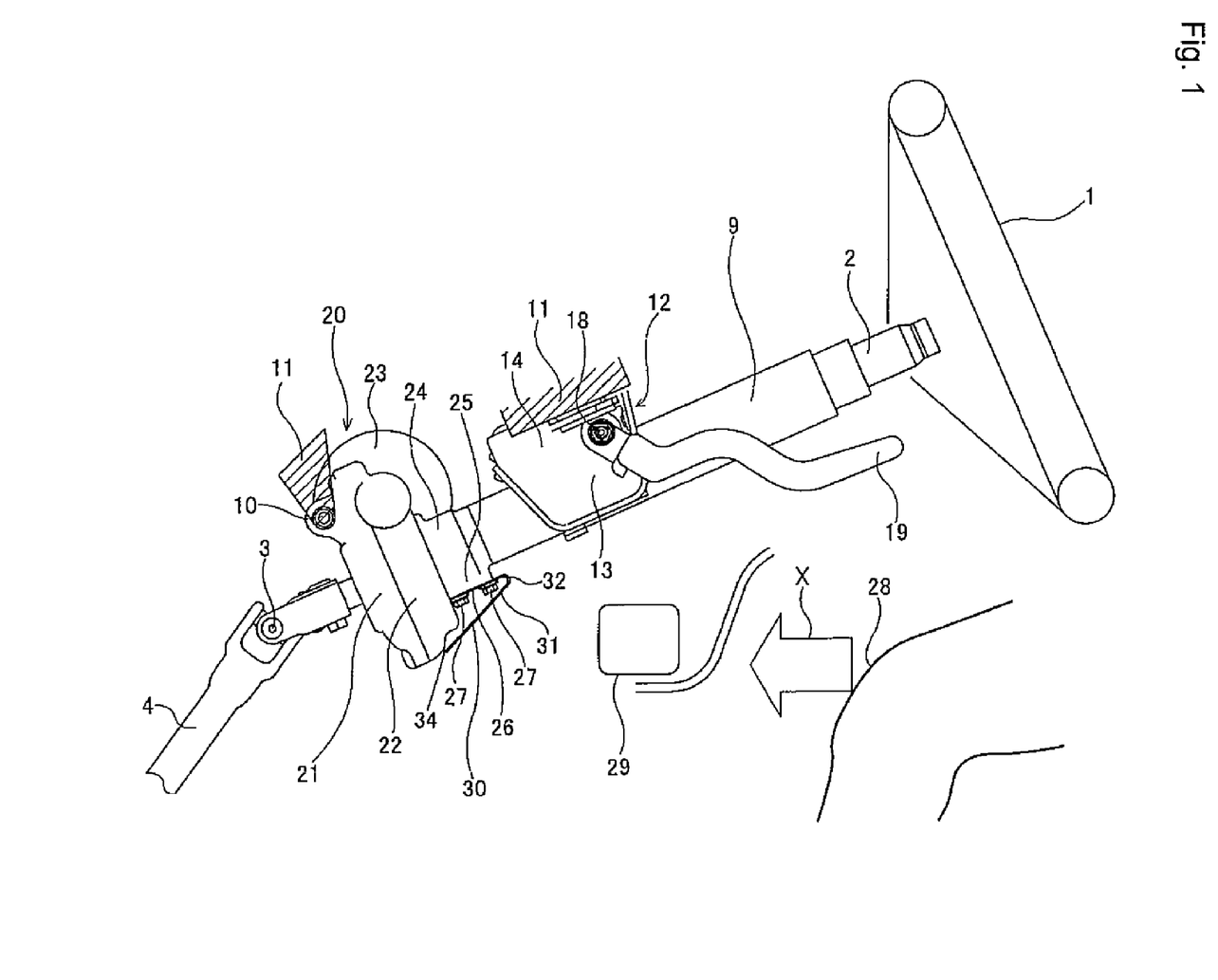
FIG. 1 is side view illustrating a first embodiment of the present invention.
Figure 2:
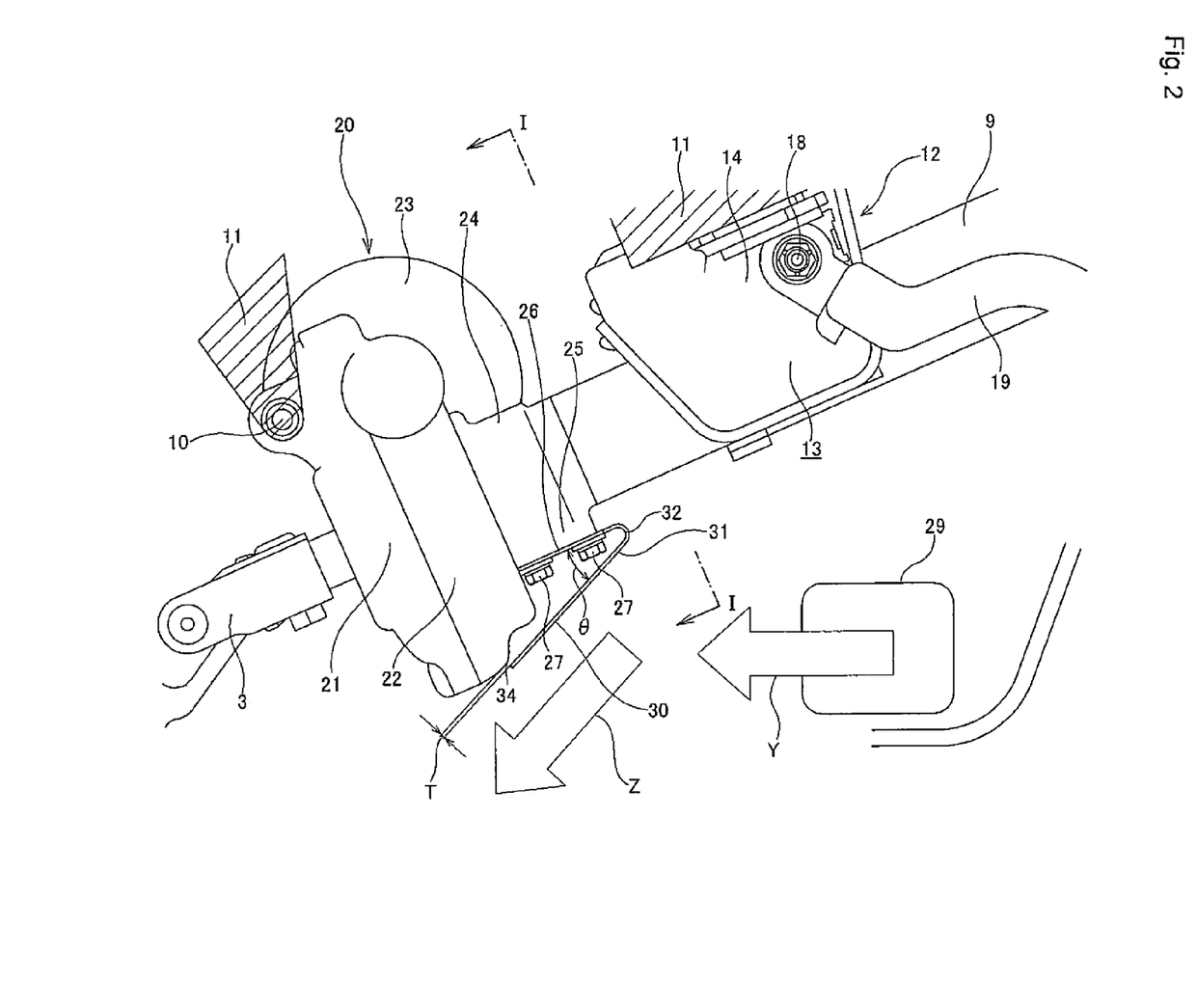
FIG. 2 is an enlarged diagram illustrating the main part of FIG. 1.
Figure 3:
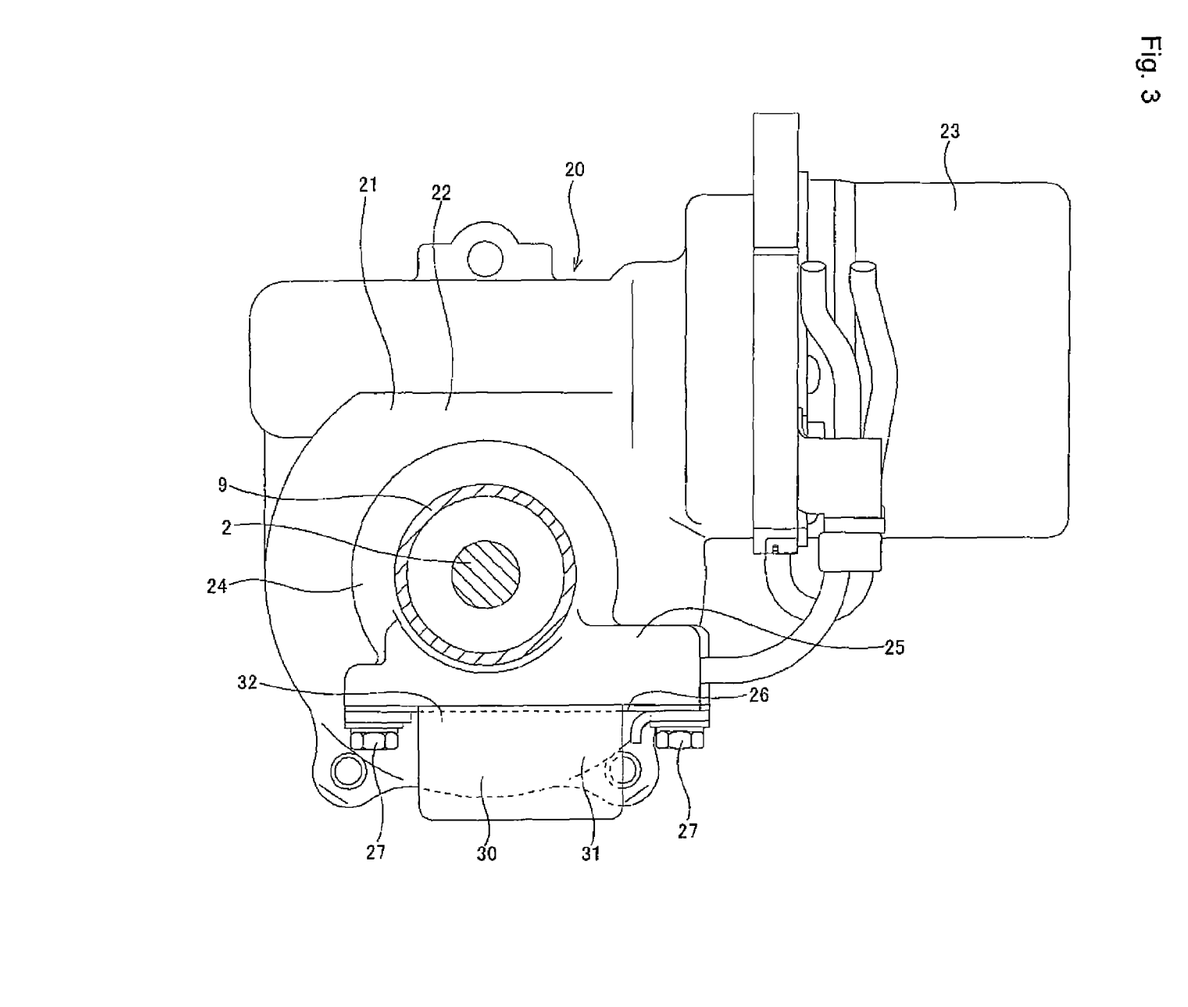
FIG. 3 is an enlarged cross-sectional diagram of section I-I in FIG. 2.

FIGS. 1 to 3 illustrate a first embodiment of the present invention in which the invention is applied to a column type electric power steering apparatus. A feature of this embodiment is the construction of the portion around the bottom end section of a housing 21 of an electric power assist mechanism 20, which is a connected member that is connected to and fastened to the front end section of a steering column 9. The construction and function of the other parts are the same as in the case of the conventional construction illustrated in FIGS. 10 to 13 described above, so the same reference numbers are given to identical parts and redundant drawings and explanations are omitted or simplified such that the following explanation centers on only the features of this embodiment.

A rectangular flat plate shaped tilted plate 30 made of steel plate is located below and behind the bottom end section of the housing 21 that protrudes downward further than the bottom surface of the front end section of the steering column 9 such that it tilts downward toward the front. This tilted plate 30 is integrally formed with the rectangular flat plate shaped cover 26 that covers the opening section (not illustrated in the figures) formed in the bottom surface of the enclosed section 25 of the housing 21. In other words, an accessory part 31 that includes the tilted plate 30 and cover 26 is made from steel plate and is formed into a single member such that the edge of the rear end of the tilted plated 30 connects to the middle section in the width direction of the edge of the rear end of the cover 26 by way of a curved plate section 32 having an arc shaped cross section in the width direction. That is, the accessory part 31 is formed into a single member by bending a steel plate, which is an elastic metal plate, and comprises: the cover 26, which is a fixed section that is attached to the bottom surface of the enclosed unit 25 of the housing 21 and covers the opening section; the tilted plate 30; and the curved place section 32, which is a curved bend section that is formed between the cover 26 and tilted place 30.

In the free state illustrated in the figure, the tilt angle of the tilted plate 30 with respect to a horizontal plane is larger than the tilt angle of the cover 26 (and steering column 9) with respect to the horizontal plane. Therefore, in the example illustrated in the figure, the tilt angle θ of the tilted plate 30 with respect to the cover 26 is about 25 degrees. This tilt angle θ can be arbitrarily set according to the shape and construction of the housing 21, positional relationship of the steering column 9 and automobile equipment 29 and the like.

Moreover, in the same state, the spacing between the top surface of the tilted plate 30 and the bottom surface of the bottom end section of the housing 21 is such that is a minimum at the edge section on the front end of this tilted plate 30, and a clearance gap is formed in this section. More specifically, the edge of the front end of this tilted plate 30 does not come in contact with the shoulder section 34 of the main section 22 of the front section of the housing 21 that this front end edge faces, and comes close to and faces this shoulder section 34 through a small clearance gap (spacing T).

When an automobile, comprising the steering apparatus of this embodiment constructed as described above, is in a collision, the body of the operator moves forward in the direction indicated by the "X" arrow in FIG. 1 due to inertia. When this happens, the operator's knees hit against automobile equipment 29, such as the fuse box, that is located in front, and there is a possibility that the automobile equipment 29 will be pushed forward in the direction indicated by the "Y" arrow in FIG. 2. When the automobile equipment 29 is pushed forward, the automobile equipment 29 hits against the bottom surface of the tilted plate 30 that is located in front of the automobile equipment 29, which smoothly directs movement of the automobile equipment 29 in the direction indicated by the "Z" arrow in FIG. 2, or in other words in the direction along the bottom surface of the tilted plate 30.

In the case of this embodiment, when the automobile equipment 29 described above hits against the bottom surface of the tilted plate 30, first, during the time up until the edge of the front end of this tilted plate 30 comes in contact with the shoulder section 34 of the main section 22 of the housing 21, the curved plate section 32 elastically deforms (or plastically deforms), and the tilt angle θ of this tilted plate 30 is elastically (or plastically) decreased, and due to this decrease, the impact energy against the knees (equivalent to the pressure energy that is applied to the bottom surface of the tilted plated 30 from the automobile equipment 29) is absorbed. At nearly the same time as this, the direction of movement of the automobile equipment 29 smoothly changes in the direction along the bottom surface of the tilted plate 30, and due to this change, the impact energy against the knees 28 is absorbed (the impact to the knees is lessened).

Furthermore, due to the elastic deformation (or plastic deformation) of the curved plate section 32, it is possible to block the impact (pressure force energy) applied to the bottom surface of the tilted plate 30 from being transmitted to the cover 26, so it is possible to effectively prevent damage to the housing 21 to which the cover 26 is fastened (it is possible to keep the effect on the housing to a minimum).

In this first embodiment described above, in the free state, the spacing T (FIG. 2) between the front end edge of the tilted plate 30 and the shoulder section 34 of the main section 22 of the housing 21 was made to be small, however, in the same state, by making the space T large by increasing the tilt angle θ of the tilted plate 30, it is possible to increase the effect of absorbing the impact energy applied to the knees 28 due to elastically decreasing the tilt angle θ of the tilted plate 30. Moreover, as described above, the tilt angle θ is arbitrarily set, however, it can be set to a maximum of about 60 degrees and preferably can be set to about 30 to 45 degrees.

Furthermore, the accessory part 31 is not limited to being made of steel plate as described above, and can be made of an elastic metal such as spring steel plate made of stainless steel. As long as the accessory part 31 comprises an attachment section for attachment to the steering column or connected member and a curved bend section for changing the tilt angle of the tilted plate, the material is not limited being elastic. For example, as long as the effect of smoothly changing the direction of movement of the automobile equipment that hits the bottom surface of the accessory part 31 in the direction along that bottom surface is not hindered, the accessory part 31 can be made of other metal plate such as an aluminum alloy plate, or can be made of a synthetic resin plate. However, when making the accessory part by aluminum die casting, not only does the part become expensive, but the part may not deform when hit by the automobile equipment, making it difficult to obtain the effect of absorbing impact energy, so is not preferred. Moreover, in order to more easily obtain the effect described above, it is possible to perform surface treatment of the bottom surface of the tilted plate such as coating the bottom surface with a low-friction synthetic resin such as polyamide resin or polytetrafluoroethylene resin. Furthermore, it is also possible to employ construction comprising a combination of a plurality of members that use these materials. The tilted plate 30 not only can have a flat plate shape (flat surface shape), but an arbitrary shape can also be adopted as long as it can absorb the impact of the automobile equipment and effectively prevent damage to the operator's knees during a collision.

Furthermore, in the first embodiment, the housing 21 of an electric power assist mechanism 20 was used as the connected member, however, in addition to this, it is possible to use part of a variable steering ratio apparatus such as a VGRS (variable gear ratio steering) apparatus or attitude control apparatus such as a VSC (vehicle stability control) apparatus. It is also possible to provide the opening section of the enclosed section 25 in a different location, and the attachment section 36 can be attached to the connected member without functioning as a cover. The accessory part 31 comprising the tilted plate 30 can also be directly attached to the steering column 9 instead of the connected member. In the example in the figures, the accessory part 31 functions as the cover section, so is fastened with bolts, however, when there is no need to remove the accessory part, it can be attached directly using a method of attachment such as welding, or indirectly by way of an attachment member such as a band.

Embodiment 2

Figure 4:
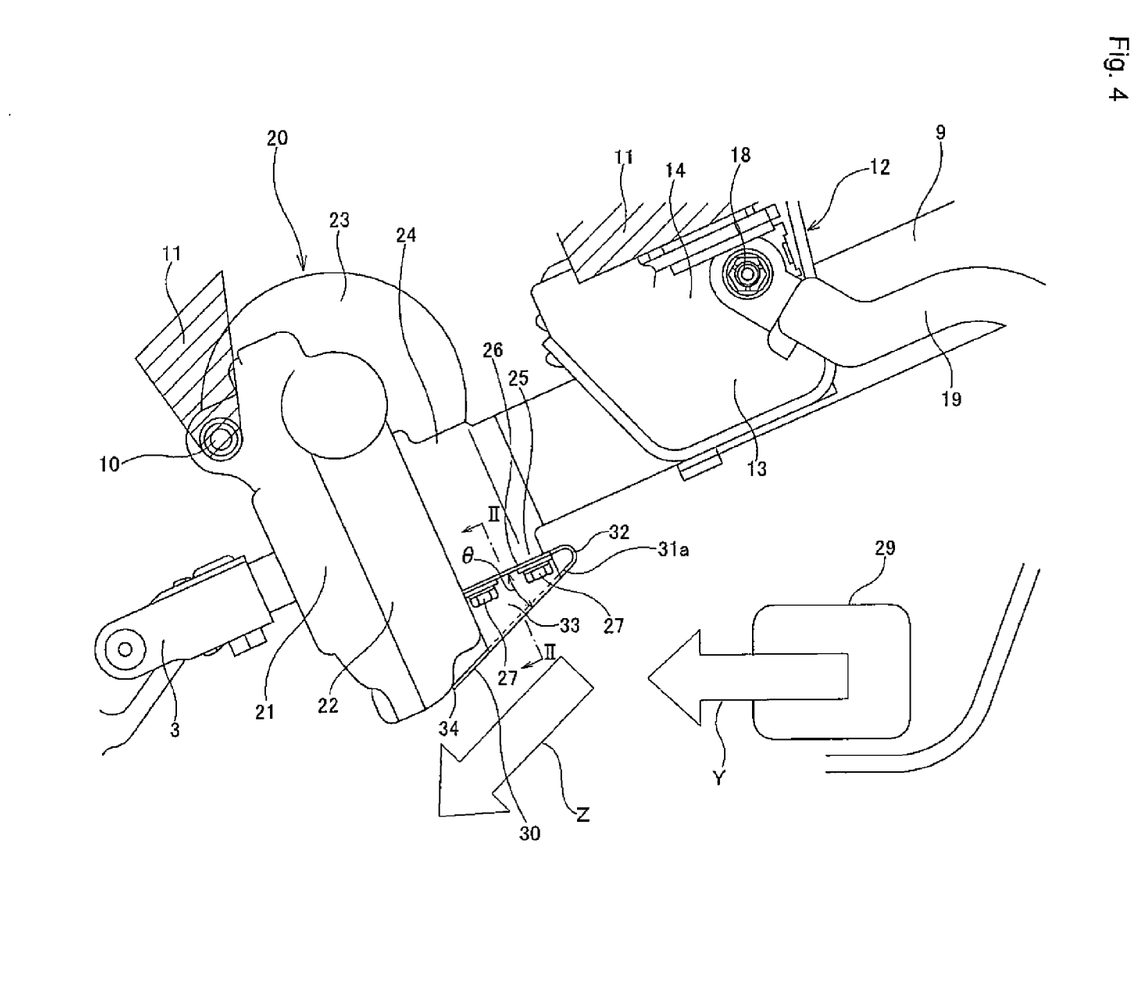
FIG. 4 is a diagram similar to FIG. 2, and illustrates a second embodiment of the present invention.
Figure 5:
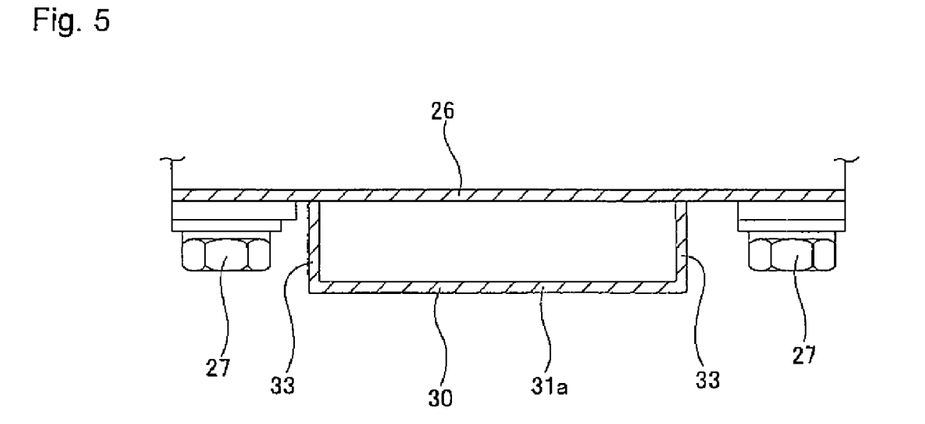
FIG. 5 is a cross-sectional diagram of section II-II in FIG. 4 with part omitted.

FIG. 4 and FIG. 5 illustrate a second embodiment of the present invention. In this embodiment, an integrally formed pair of side plates 33 extend from both sides in the width direction of the middle section of the tilted plate 30 of the accessory part 31a toward the cover 26 of the accessory part 31, and the edges on the top end of these side plates 33 come in contact with the bottom surface of the cover 26. By using this kind of construction, when the automobile equipment 29 hits against the bottom surface of the tilted plate 30, the resistance to deformation of the tilted plate 30 is increased. In other words, deformation of the tilted plate 30 that occurs due to the automobile equipment 29 hitting against the bottom surface of this tilted plate 30 does not cause a problem when contained to small elastic deformation (or plastic deformation), so from the aspect of being able to absorb the impact energy to the knees 28 is preferable. However, when that deformation increases excessively, the automobile equipment 29 that moves forward, moves in between the main section 22 and the enclosed section 25 of the housing 21, which hinders the movement of the automobile equipment 29 after collision and causes a possibility of large impact being applied to the knees 28. Therefore, in this embodiment, in order to keep such a possibility small, the resistance to deformation of the tilted plate 30 is increased as described above.

When employing the construction of this embodiment, by changing the shape of both side plates 33 (for example, flat plate shape, curve plate shape, cornice shape and the like), the dimensions (width dimension, thickness dimension), and the tilt angle with respect to the tilted plate 30, it is possible to adjust the deformation resistance of the tilted plate 30. Furthermore, the deformation resistance can be tuned by forming both side plates 33 into a V shape, or by forming holes or ribs therein. In doing so, it is possible to prevent problems such as described above from occurring, and to adequately obtain the effect of absorbing impact energy by allowing only a little elastic or plastic deformation to occur during a collision.

Moreover, in this embodiment, in the free state, edges of the top ends of both side plates 33 come in contact with the bottom surface of the cover 26, and the edge of the front end of the tilted plate 30 comes in contact with the edge of the bottom end (shoulder section 34 in the example in the figures) of the main section 22 of the housing 21, however, it is also possible to form clearance gaps at these contact locations. By providing clearance gaps such as these, the effect of absorbing impact energy by elastic deformation (or by plastic deformation) to reduce the tilt angle θ of the tilted plate 30 can be obtained as in the first embodiment described above until that clearance gap is gone. The other construction and functions are the same as in the first embodiment described above.

As another method of increasing the deformation resistance of the tilted plate 30 is a method of increasing the thickness of the tilted plate 30. By applying this method, as in the construction of the first embodiment, the possibility of the tilted plate 30 deforming too much becomes low as described above, even when construction does not comprise a pair of side plates 33.

Embodiment 3

Figure 6:
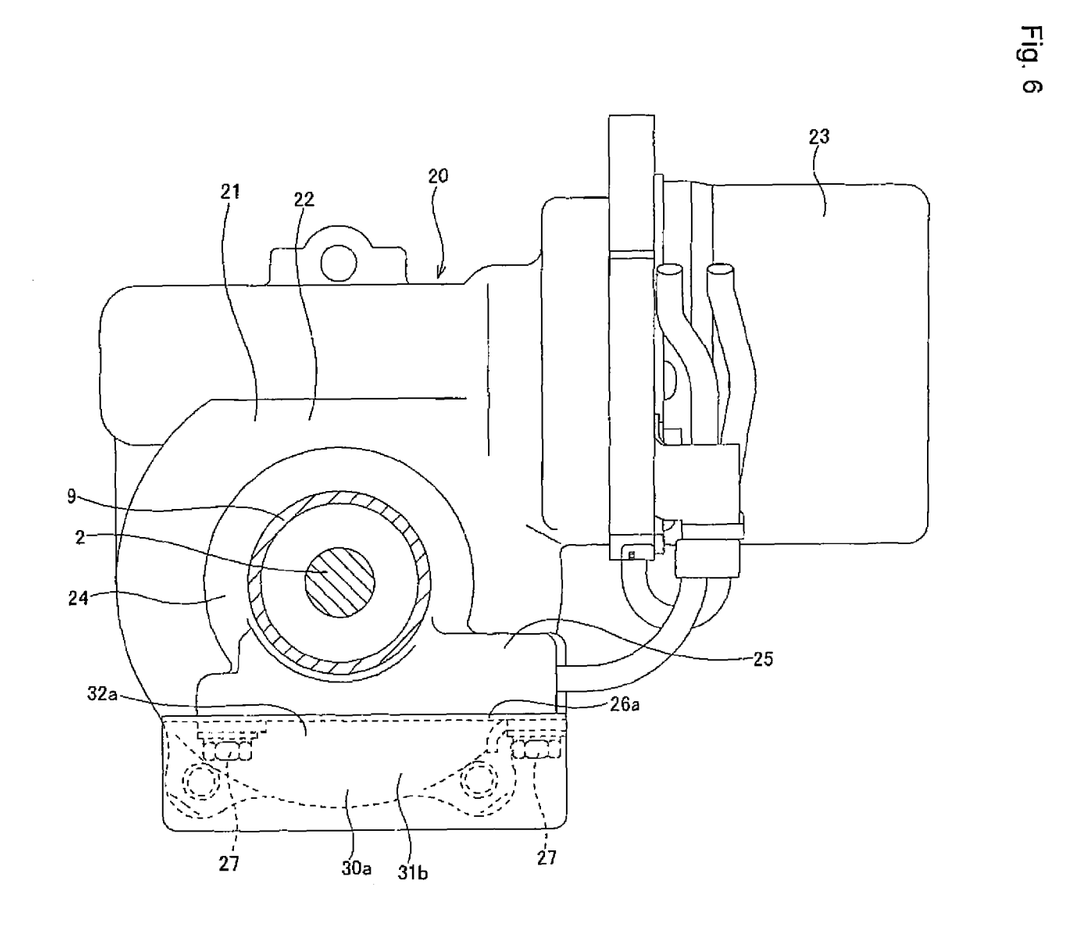
FIG. 6 is a diagram similar to FIG. 3, and illustrates a third embodiment of the present invention.

FIG. 6 illustrates a third embodiment of the present invention. In this embodiment, as seen from the direction of the figure, by increasing the width dimension (dimension in the left and right direction of FIG. 6) of the entire accessory part 31b (cover 26a, tilted plate 30a and curved bend section 32a), the tilted plate 30 covers and hides the entire bottom end section of the main section 22 of the housing 21 when seen from the rear. In doing so, it is possible to completely prevent the automobile equipment 29 (see FIGS. 1 to 2) from hitting the bottom end section of the main section 22. The other construction and function are the same as in the first embodiment described above and illustrated in FIGS. 1 and 2.

Embodiment 4

Figure 7:
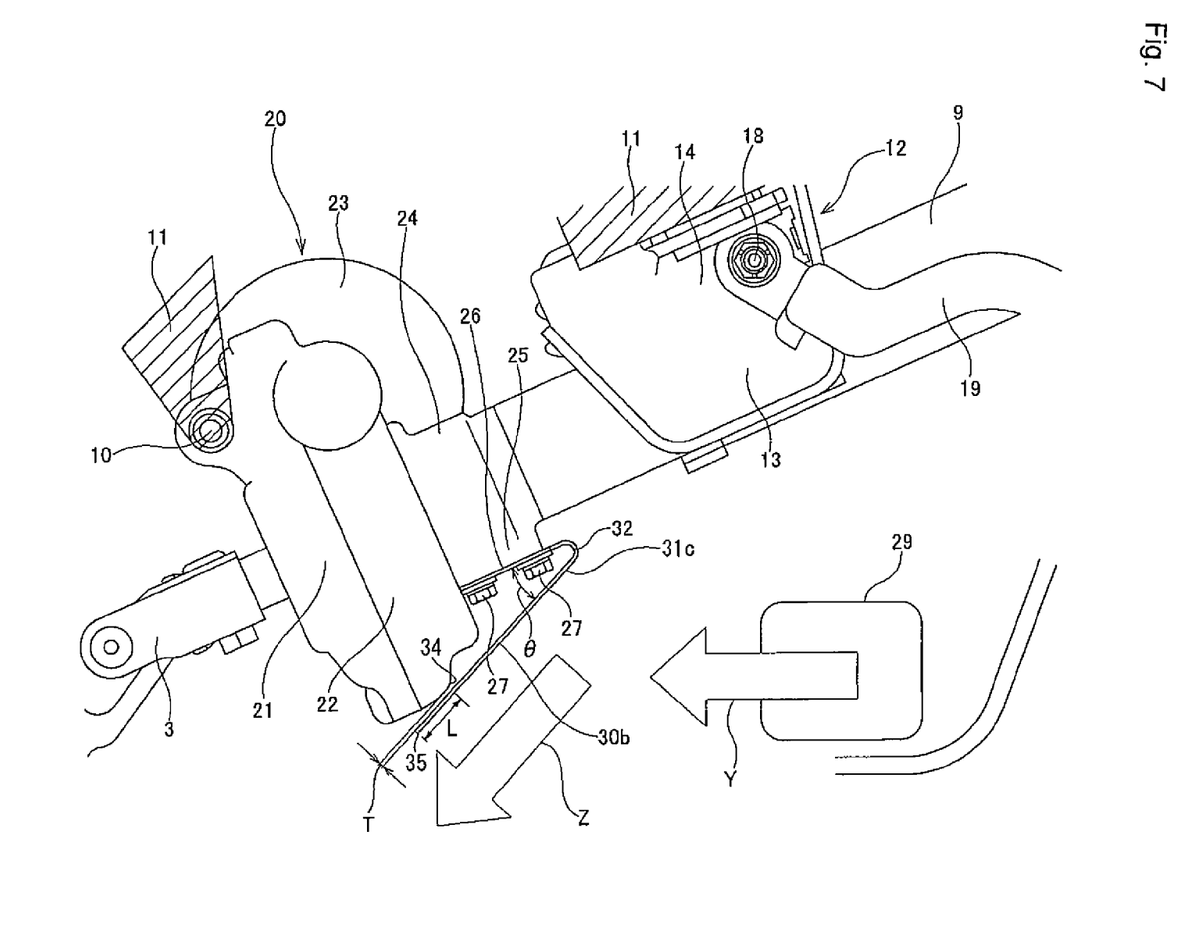
FIG. 7 is a diagram similar to FIG. 2, and illustrates a fourth embodiment of the present invention.

FIG. 7 illustrates a fourth embodiment of the present invention. In this embodiment, the edge of the front end of the tilted plate 30b of the accessory part 31c extends forward by a length L to form an extension section 35 on the front end section of the tilted plate 30b. By doing so, in this embodiment, the edge of the front end of the tilted plate 30b is located further forward than the shoulder section 34 of the main section 22 of the housing 21. Moreover, in the free state of this accessory part 31c, the spacing between the top surface of the tilted plate 30b and the bottom surface of the bottom end section of the housing 21 is a minimum in the middle portion of the tilted plate 30b, with a small clearance gap (spacing T) formed in this portion.

In the case of this embodiment having this kind of construction, the extension section 35 of the tilted plate 30b can completely cover the portion that is located further on the front side than the shoulder section 34 of the main section 22 of the housing 21. Therefore it is possible to effectively prevent the automobile equipment 29 (see FIGS. 1 and 2) from directly hitting the housing 21, as well as it is possible to smoothly move the automobile equipment 29 along the bottom surface of the tilted plate 30b. Consequently, it is possible to effectively prevent a large impact from being applied to the operator's knees. The other construction and functions are the same as in the first embodiment described above and illustrated in FIGS. 1 and 2.

Embodiment 5

Figure 8:
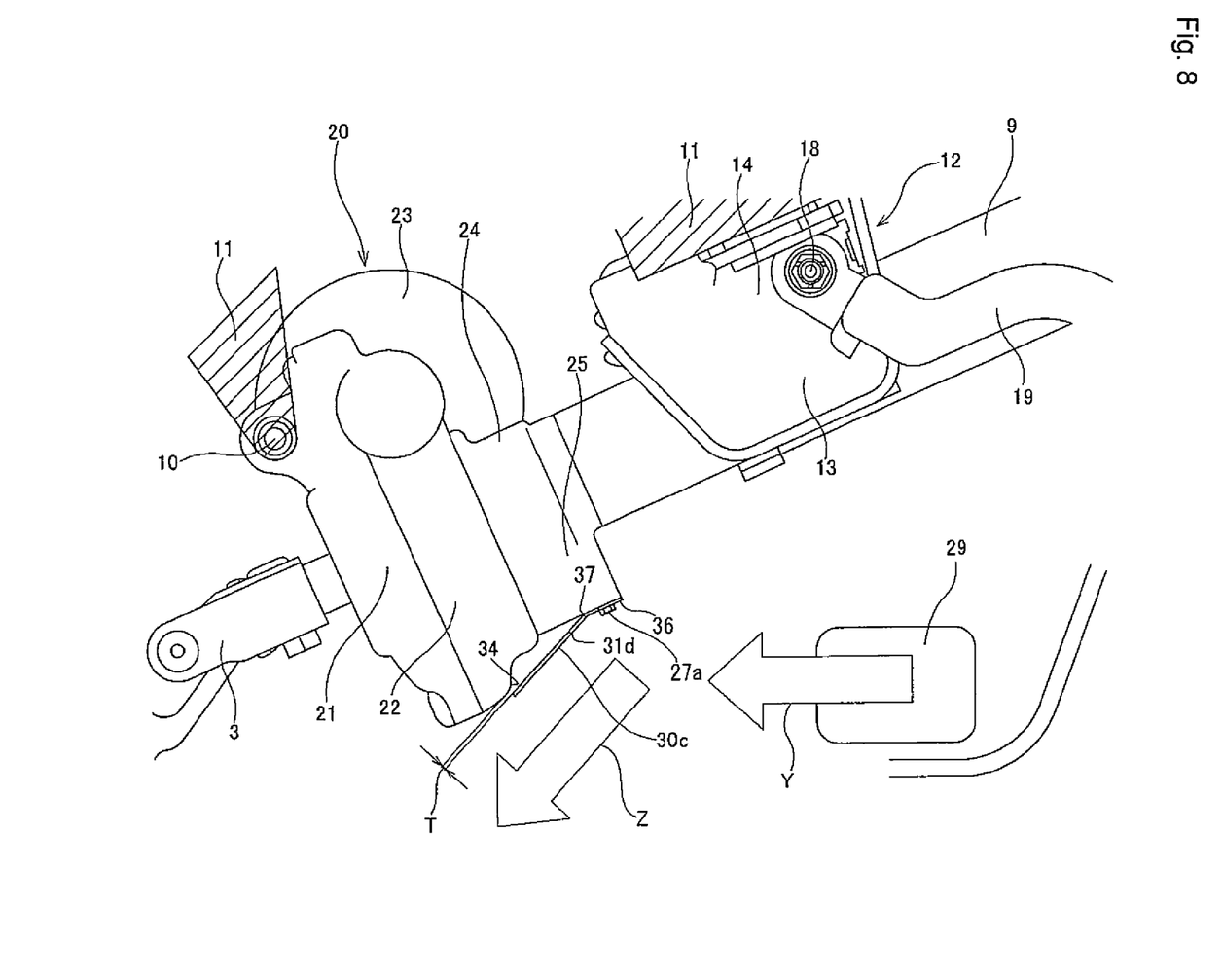
FIG. 8 is a diagram similar to FIG. 2, and illustrates a fifth embodiment of the present invention.

FIG. 8 illustrates a fifth embodiment of the present invention. In this embodiment as well, the accessory part 31 d is formed as an integrated part by performing processing such as bending of a single steel plate, which is an elastic metal plate. This kind of accessory plate 31d comprises an attachment section 36 that is fastened to the bottom surface of the sub section 24 of the housing 21 by bolts 27a, a tilted plate 30c, and a curved bend section 37 that is located in the middle section between the attachment section 36 and the tilted place 30c. Particularly in this embodiment, the edge of the rear end of the tilted plate 30c is connected to the edge of the front end of the attachment section 36 by way of the curved bend section 37, and in the free state, the tilt angle θ of the tilted plate 30c with respect to the attachment section 36 is an obtuse angle. In this kind of embodiment, when the automobile equipment 29 (see FIGS. 1 and 2) hits against the bottom surface of this tilted plate 30c, the tilt angle θ increases (on the other hand, the tilt angle with respect to the horizontal plane decreases). In this way, the construction of the curved bend section 37 can be arbitrary as long as it allows for the tilt angle of the tilted plate 30c to change with respect to the attachment section 36. Also, for example, when the member to which the attachment section 36 is attached is tilted with respect to the axis of the steering shaft, and when there is no need for an angle between the attachment section and the tilted plate, the accessory part can comprise one plate having elasticity. Furthermore, in this construction as well, the attachment section 36 of the accessory part 31 d can be fastened to the steering column instead of the sub section 24 of the housing 21.

The attachment section 36 of the accessory part 31d of this embodiment does not function as a cover for covering the opening section, and only functions as an attachment section for fastening the accessory part 31d to the housing 21. Therefore, when there is an opening section in the housing 21, a separate cover is provided for covering this opening section. Moreover, in this embodiment, in the free state of the accessory part 31d, the spacing between the top surface of the tilted plate 30c and the bottom surface of the housing 21 is a minimum at the edge section of the front end of the tilted plate 30c, with a space formed in that section. More specifically, the edge of the front end of the tilted plate 30c closely faces the shoulder section 34 of the main section 22 of the front section of the housing 21 via a small clearance gap (spacing T).

In the case of this embodiment constructed as described above, when the automobile equipment 29 (see FIGS. 1 and 2) hits against the bottom surface of the tilted plate 30c, first, up until the edge of the front end of the tilted section 30c comes in contact with the shoulder section 34 of the main section 22, the curved bend section 37 elastically (or plastically) deforms and the tilt angle θ of the tilted section 30c elastically (or through plastic deformation) increases, causing the impact energy toward the knees 28 to be absorbed. Moreover, even after the edge of the front end of the tilted plate 30c comes in contact with the shoulder section 34 of the main section 22, the tilted plate 30c elastically (or through plastic deformation) bends a little, causing the impact energy toward the knees 28 to be absorbed. At nearly the same time as this, the direction of movement of the automobile equipment 29 is smoothly changed in the direction along the bottom surface of the tilted plate 30c, causing the impact energy toward the knees 28 to be absorbed (the impact applied to the knees 28 is lessened).

Furthermore, in this embodiment, the tilt angle θ between the attachment section 36 and the tilted plate 30c is an obtuse angle, and the tilted plate 30c does not cover the attachment section 36, so has the advantage in that the work of fastening the attachment section 36 to the housing 21 can be performed easily. The other construction and functions are the same as in the first embodiment described above and illustrated in FIGS. 1 to 3.

In embodying the present invention, of the members existing around the steering column, by providing a smooth angle at locations that are not covered by the tilted plate and in locations where there is a possibility of being hit by the automobile equipment, and by making it such that forward movement of the automobile equipment is not impeded even when the automobile equipment hits such locations, advantages are obtained from the aspects of packaging, cost and function (safety).

Moreover, in the construction of each of the embodiments described above, an electric motor 23 of an electric power assist mechanism 20, and lifting and lowering bracket 15 of a clamp mechanism 12 are located above the steering shaft 2, so during a collision of the automobile, it is difficult for the electric motor 23 and clamp mechanism 12 to hit the operator's knees, which is preferred from the aspect of protecting the operator's knees 28. When embodying the present invention, by locating the members around the steering column in suitable locations, the advantages of the present invention are optimally obtained.

REFERENCE NUMBERS

1 Steering wheel
2 Steering shaft

3 First universal joint
4 Intermediate shaft
5 Second universal joint
6 Steering gear unit
7 Input shaft
8 Tie rod
9 Steering column
10 Horizontal shaft
11 Automobile body
12 Clamp mechanism
13 Support bracket
14 Clamp plate unit
15 Lifting and lowering bracket
16 Long hole
17 Through hole
18 Tilt bolt
19 Tilt lever
20 Electric power assist mechanism
21 Housing
22 Main section
23 Electric motor
24 Sub section
25 Enclosed section
26, 26a Cover
27 Bolt
28 Knees
29 Automobile equipment
30, 30a, 30b, 30c Tilted plate
31, 31a, 31b, 31c, 31d Accessory part
32, 32a Curved plate section
33 Side plate
34 Shoulder section
35 Extension section
36 Attachment section
37 Curved bend section

The invention claimed is:

1. A steering apparatus comprising:
a steering column supported by a vehicle body;
a connected member that, when the steering column is supported by the vehicle body, is connected and fastened to a front end section of the steering column, with a bottom end section thereof protruding further downward than a bottom surface of the front end section of the steering column; and
a tilted plate that tilts downward in the forward direction arranged below and behind a portion of the bottom end section of the connected member that protrudes further downward than the bottom surface of the front end section of the steering column, such that the tilted plate covers at least a central section in the width direction of this protruding portion,
wherein the tilted plate is a component of an accessory part that is connected and fastened to the steering column or the connected member directly or by way of another member, and
wherein the accessory part is capable of decreasing the tilt angle of the tilted plate with respect to a horizontal plane a specified amount by applying a pressure force to the bottom surface of the tilted plate, and has a function of absorbing the energy of the applied pressure by the decrease of this tilt angle and deformation of the tilted plate itself.

2. The steering apparatus according to claim 1, wherein the accessory part is made from a single plate having elasticity.

3. The steering apparatus according to claim 1, wherein the accessory part comprises: an attachment section that is fastened to the steering column or connected member; the tilted plate; and a curved bend section that connects the attachment section and tilted plate.

4. The steering apparatus according to claim 3, wherein the attachment section of the accessory part functions as a cover that covers an opening section that is formed in the steering column or connected member.

5. The steering apparatus according to claim 1, wherein a clearance gap is formed in a portion where the spacing between a top surface of the tilted plate and a bottom surface of the portion of the bottom end section of the connected member that protrudes further downward than the bottom surface of the front end section of the steering column, that face each other, is a minimum.

6. The steering apparatus according to claim 5, wherein the spacing between a top surface of the tilted plate and a bottom surface of the portion of the bottom end section of the connected member that protrudes further downward than the bottom surface of the front end section of the steering column, that face each other, is a minimum in the middle portion of the tilted plate.

7. The steering apparatus according to claim 3, wherein the curved bend section has an arc shaped cross section in the width direction.

8. The steering apparatus according to claim 5, wherein the spacing between a top surface of the tilted plate and a bottom surface of the portion of the bottom end section of the connected member that protrudes further downward than the bottom surface of the front end section of the steering column, that face each other, is a minimum at the edge section on the front end of the titled plate.

9. The steering apparatus according to claim 1, wherein the connected member is a housing that houses an electric power assist mechanism.

* * * * *